Sept. 11, 1973          M. E. ADAMS          3,758,340
LEAD ACID STORAGE BATTERY PLATES AND PROCESS FOR PASTING THEM
Filed Oct. 27, 1971                    2 Sheets-Sheet 1

INVENTOR.
Morris E. Adams
BY
Lawrence B. Plant
ATTORNEY

Sept. 11, 1973   M. E. ADAMS   3,758,340
LEAD ACID STORAGE BATTERY PLATES AND PROCESS FOR PASTING THEM
Filed Oct. 27, 1971   2 Sheets-Sheet 2

INVENTOR.
Morris E. Adam.
BY
Lawrence B. Plant
ATTORNEY 3,758,340
LEAD ACID STORAGE BATTERY PLATES AND
PROCESS FOR PASTING THEM
Morris E. Adams, Anderson, Ind., assignor to General
Motors Corporation, Detroit, Mich.
Filed Oct. 27, 1971, Ser. No. 192,929
Int. Cl. H01m 35/26
U.S. Cl. 136—67       2 Claims

ABSTRACT OF THE DISCLOSURE

A lead-acid storage battery plate and process for pasting a continuous strip of grids including continuously sandwiching a fiber-laden paste and grid strip between layers of perforated paper.

---

This invention relates to a process for continuously pasting a continuous strip of lead acid storage battery grids and the plates produced therefrom. More specifically, this invention relates to overpasted grids in which the grid, including its borders, is completely submerged in the paste of active material. This is distinguished from flush pasted grids where the paste merely fills the interstices of the grid and is coplanar with the borders of the grid.

Techniques have heretofore been suggested for the flush pasting of continuous strips of storage battery grids and employing continuous strips of paper on either side of the plate to prevent the plates from sticking to the apparatus and to each other and to further prevent the paste from falling out of the interstices. In one such process a grid strip is laid atop a strip of paper and both passed under a paste dispensing hopper and scrapper which flush fills the grid with paste after which a second strip of paper is applied to the pasted grid. The paper may be left on the plates even into final battery assembly. This type of process has not received significant commercial acceptance and is not acceptable for overpasted plates where paste must be applied over both sides of the grid as well as within the interstices. Even with the flush-pasted plates, one of the problems encountered is the tendency for the paper to peel off the plates as they dry. It is an object of this invention to provide a continuous process for overpasting a battery grid and permanently sandwiching the overpasted grid between two strips of paper. It is another object of this invention to provide a battery plate having layers of paper firmly anchored to each face of the grid. These and other objects of this invention will become more apparent from the detailed description which follows.

In a preferred form, this invention comprehends perforating continuous strips of absorbant paper to provide a plurality of anchoring tabs on one face thereof and passing the strips, with their tabs facing inwardly, into the nip of opposed, coacting, sizing rollers while at the same time introducing a continuous length of grids and an appropriate fiber-laden lead-acid storage battery paste between the strips of paper at the nip and merging them together in the gap between the rollers to form a continuous length of battery plates. The gap between the rollers is slightly less than the thickness of the finished plate. Hence there is a slight squeezing action in the gap between the rollers which is followed by a growing or slow swelling of the plates after leaving the rollers. The squeezing action firmly imbeds the tabs in the paste and forces water out of the paste and into the paper for faster drying of the paste. The paper clad plates may be perforated after passing through the plate forming rollers, but care must be taken to prevent breakage of the grid wires by the perforators. Prepunching of the paper eliminates the need for concern over breaking of the grid wires and is hence preferred.

This invention is useful with conventional battery maker's lead oxide pastes which contain reinforcing fibers. In this regard, it is useful with fiber-laden art-known sulfate or acid pastes which require curing after drying or fiber-laden water-based pastes such as disclosed in copending U.S. patent application Ser. No. 157,003, filed on June 25, 1971, in the names of Richard N. Snyder et al. and assigned to the assignee of the present invention. The invention is useful for both positive and negative plates. The term "lead oxide" will be used herein to include those lead oxides which are normally used by lead-acid battery manufacturers. These oxides are usually mixtures of lead oxides, typically the red and yellow oxides, with up to as much as 30% free lead. In the case of negative plates, conventional art-known expanders are used with the lead oxides. The term "fiber-laden" will be used herein to describe pastes containing conventional strengthening fibers such as Dynel, polypropylene or the like and known to those skilled in this art. These fibers will generally vary from about $\frac{1}{16}''$ to about $\frac{1}{4}''$ long and are used in quantities of about 0.05% to about 0.25% of the paste weight. Though specific paste formulations will be given hereafter by way of example, they in no way limit the applicability of the invention here involved.

Figure 1:
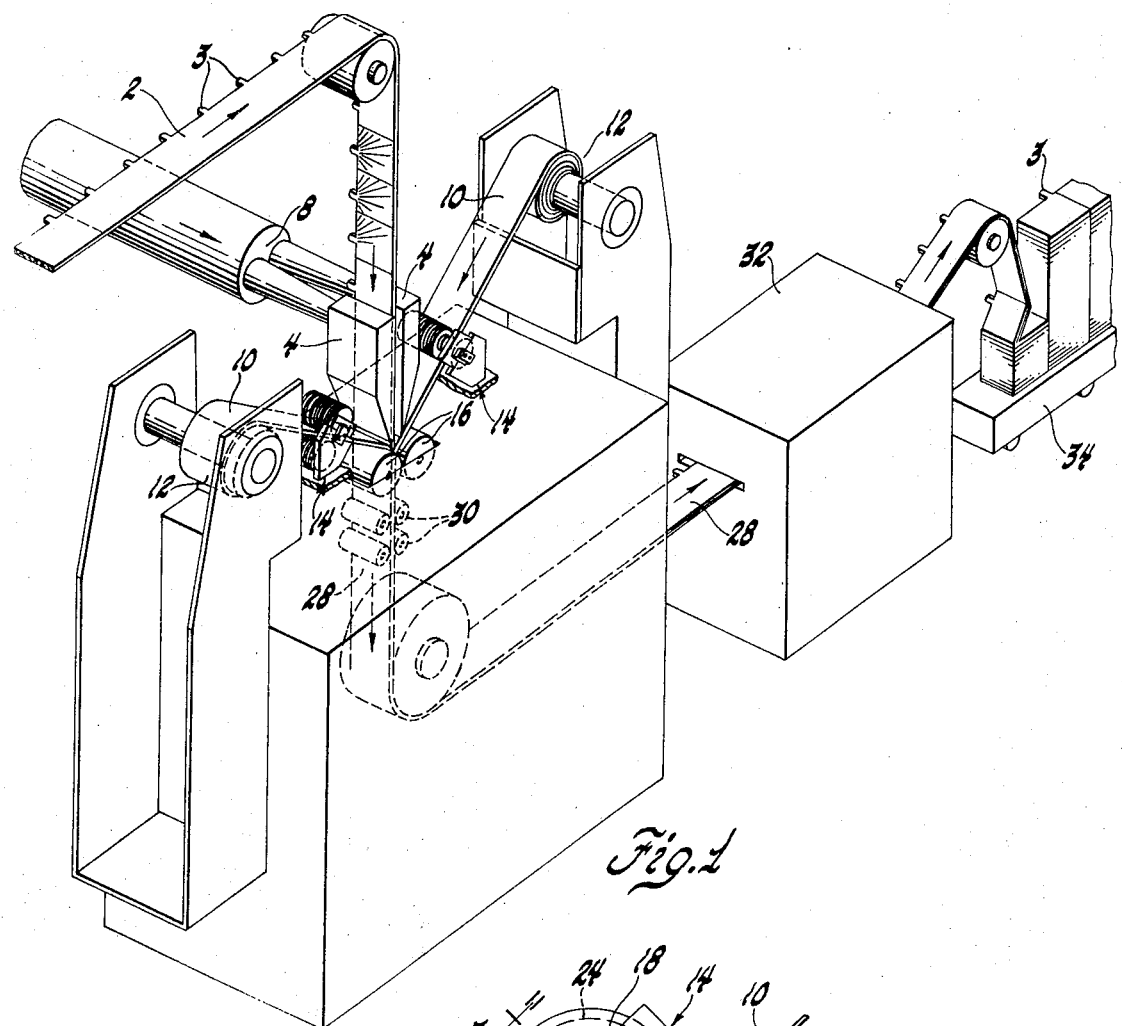
FIG. 1 is a perspective view of apparatus for carrying out this invention.
Figure 2:
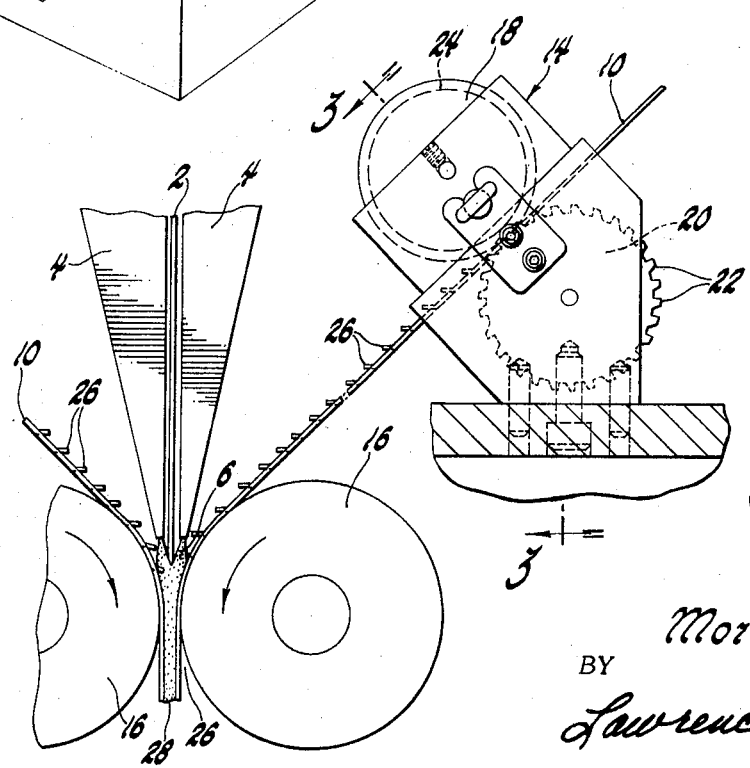
FIG. 2 is an enlarged side elevational view of the paper perforating and plate forming steps of this invention.
Figure 3:
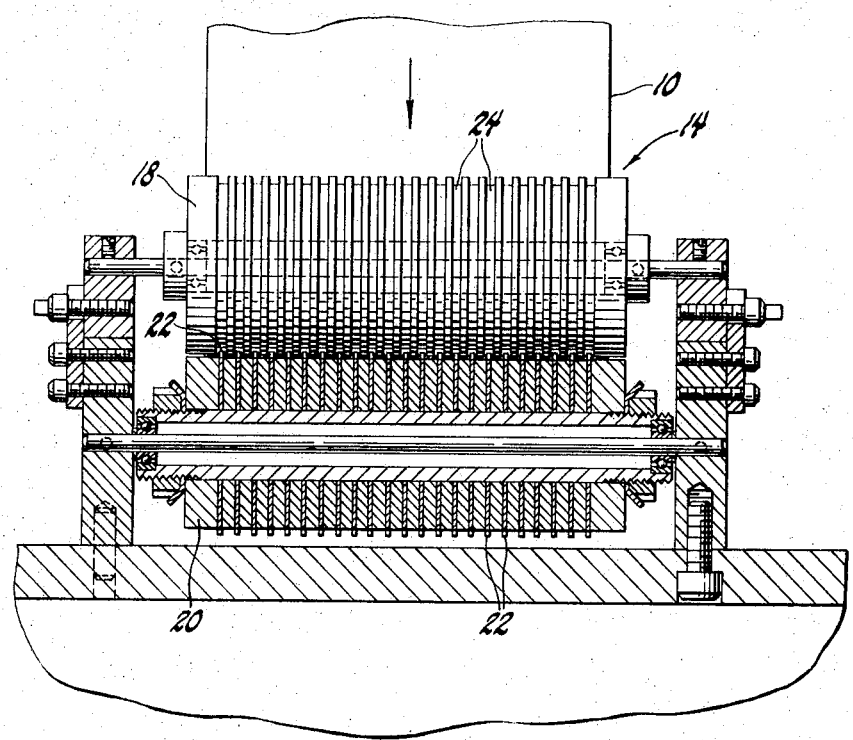
FIG. 3 is a partially sectioned elevational view of the perforator of FIG. 2 taken along the lines of 3—3.

In the figures, a continuous strip of battery grids 2 having lugs 3 is fed between two paste dispensing hoppers 4. One such grid strip 2 is disclosed in U.S. patent application Ser. No. 70,008 filed on Sept. 8, 1970, in the name of Ellis G. Weadon et al. and assigned to the assignee of this invention. The hoppers 4 are vibrated by means not shown to ensure continuity and uniformity of flow of the paste 6 therefrom. The paste 6 is fed to the hoppers 4 from a paste supply means or paste conveyor 8. Strips of paper 10 from rolls 12 are fed between coacting members 18–20 of perforators 14 and into the nip of the sizing rollers 16, as best shown in FIG. 2. The perforators comprise two coacting drum-like members 18 and 20. The lower member 20 comprises a plurality of teeth 22 which coact with slots 24 in the upper member 18 to punch out a plurality of trapezoidal tabs 26. Appropriate suporting, journaling and driving means for the perforator 14 are depicted in FIG. 3. The perforated strips 10 having tabs 26 merge with the paste 6 and grid 2 in the gap 26 between the rollers 16. The paper enters the nip with the tabs 26 oriented as shown in FIG. 2 to ensure that it becomes imbedded in the paste rather than merely folding back into the plane of the paper. The gap 26 between the rollers 16 is maintained at a dimension which is slightly less than the thicknes of the finished plate 28. Additional sizing rollers 30 similarly gapped may be provided, if desired, as a further means to control plate thickness uniformity. The plate strip 28 emerging from the rollers 16 is finally passed through a drier 32 and accumulated by an appropriate means 34 for curing, storing or usage elsewhere in the plant depending on the chemistry of the particular paste used (i.e. water-based, sulfate or acid pastes). Take-up drums (not shown) may also be used to accumulate the plate strip 28. In the alternative, the plate strip 28 may be fed directly into other processing equipment such as cutters, stackers and the like which are process-wise downstream of the pasting operation but otherwise used in manufacture and assembly of a battery.

Figure 4:
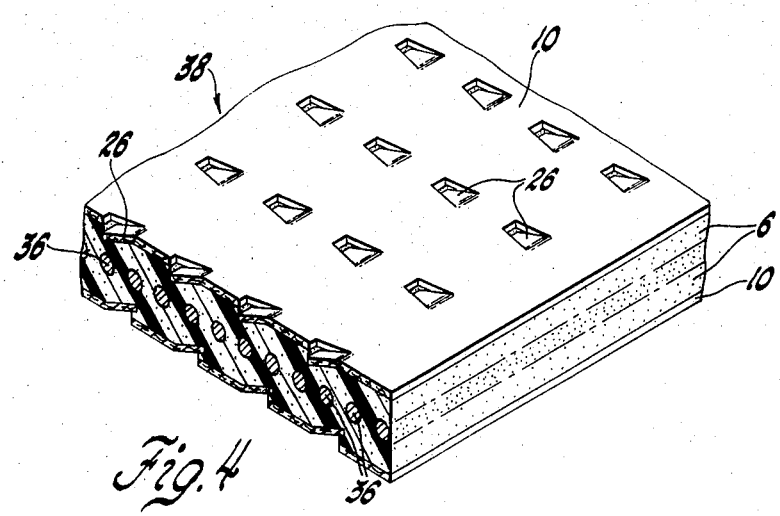
FIG. 4 is an enlarged portion of a finished battery plate formed by the process of this invention.

Individual battery plates 38 are eventually cut from the strips 28 and a portion of such a plate is shown in FIG. 4. The grid, which is here depicted as wires 36, is filled and overpasted with paste 6 and clad with the perforated paper 10. Tabs 26 of the paper 10 are imbedded in the paste 6 and anchor the paper cladding to the plate. The tabs are trapezoidally shaped and at least about 10–12 tabs per square inch are desirable for good anchorage.

The following is a specific example of a process for manufacturing 0.065 inch thick plate strips at a rate of about 50 ft./min. Paper strips 6.5 inches wide and about 0.0015 inch thick are fed through the perforator which punches the tabs into the paper at a density of about sixteen tabs per square inch. It is next fed between the sizing rollers which are maintained at a gap of about 0.055 inch. At the same time, a grid strip having a lead wire thickness of 0.045 inch is fed into the nip of the rollers between the paper strips. Paste containing about 12% moisture is fed from the hoppers into the nip of the rollers and the grid strip overpasted to about 0.010 inch on each side. For purposes of this example the paper is a machine glazed, Kraft type paper which is unbleached, 100% chemical softwood pulp paper containing no sizing. The paper contains no metallics, acid residues and less than about 2% by weight organics. The weight of the paper is 15–20 lbs. as determined by ASTM–D646. It has a moisture content of about 6–7% (ASTM–D644) and a Gurley porosity of 10–15 sec., (ASTM–D726). The Tappi size of the paper material is 0. The general characteristics of the paper should be that it exhibits a wrinkle-free quality when wet and have at least some degree of wet tear strength. It should degrade to the extent of losing its coherence after about 24 hours exposure to 1.100–1.270 specific gravity sulfuric acid at room temperature.

A positive or negative paste formulation is fed at a rate of 1800 lbs. per hour from the hoppers. A typical positive paste formulation would contain about 300 lbs. lead oxide, 19 liters water, 4.9 liters sulfuric acid (1.400 s.g.), 340 g. of 0.25% sodium perborate, 136 g. of ¼″ Dynel fiber and 204 g. of ⅛″ Dynel fiber. It has a plasticity of about 335 mm., and a drop weight of about 70 g. per in.³. A typical negative paste formulation would include about 300 lbs. lead oxide, about 18 liters water, about 9.5 liters sulfuric acid (1.400 s.g.), about 136 g. of ¼″ Dynel fibers, about 204 g. of ⅛″ Dynel fiber and 1180 g. of nickel-free expander material similar to that disclosed in U.S. patent Hindall 2,436,299. The plate produced by this process has a 0.045 inch grid overpasted to about 0.010 inch on each side with fiber-laden paste and clad with perforated absorbant paper about 0.0015 inch thick. The trapezoidal tabs are about 0.063 inch long, about 0.047 inch at the base or fold and about 0.031 inch at the tip.

While this invention has been discussed primarily in terms of specific embodiments thereof and it is not limited thereto but rather only to the extent hereinafter set forth in the claims which follow.

We claim:

1. A process for continuously overpasting a continuous length of lead acid storage battery grids to a predetermined thickness comprising the steps of: feeding at least two continuous strips of absorbent paper strips into the nip of opposing coacting rollers to form a grid-length-receiving and paste-receiving mouth between the paper strips at the nip, said rollers having a gap therebetween which is slightly less than said predetermined thickness; feeding a continuous length of grids into said mouth between said paper strips; dispensing fiber-laden, lead oxide paste into said mouth on either side of said grid length and between said paper strips; rolling said paper strips, grid length and paste together between said rollers to substantially uniformly pack said paste in and about said grid length, to squeeze excess moisture from said paste into said paper and to form a continuous paper-clad plate strip; and perforating said paper to provide a plurality of anchoring tabs for anchoring the paper to the paste and preventing its peeling away from the paste during subsequent processing of the plate strip and plates derived therefrom.

2. A process continuously overpasting a continuous length of lead acid storage battery grids to a predetermined thickness comprising the steps of:
    (a) perforating at least two continuous strips of plate-cladding paper to provide a plurality of anchoring tabs on one side of each strip of paper;
    (b) feeding the perforated strips into the nip of opposing coacting rollers to form a grid-length-receiving and paste-receiving mouth between the paper strips at the nip, said rollers having a gap therebetween which is slightly less than said predetermined thickness;
    (c) feeding a continuous length of grids into said mouth between said paper strips;
    (d) dispensing fiber-laden, lead oxide paste into said mouth on either side of said grid length and between said paper strips;
    (e) rolling said paper strips, grid-length and paste together between said rollers to substantially uniformly pack said paste in and about said grid length, to squeeze excess moisture from said paste into said paper and to form a continuous paper-clad plate strip having a thickness less than the predetermined thickness; and
    (f) allowing said plate strip to swell to about said predetermined thickness;

said paper serving to enhance drying of the plate by absorbing water from the bulk of the paste during the squeezing operation and to strengthen the plate and improve its in-plant handling characteristics; and said tabs serving to anchor the paper to the paste to prevent its peeling away from the paste during subsequent processing of the plate strip and plates derived therefrom.

References Cited
UNITED STATES PATENTS

| | | | |
|---|---|---|---|
| 337,299 | 3/1886 | Brush | 136—26 |
| 552,322 | 12/1895 | Krotz et al. | 136—26 |
| 1,051,816 | 1/1913 | Morrison | 136—37 |
| 1,197,737 | 9/1916 | Hayden | 136—67 |
| 1,637,426 | 8/1927 | Nordhaus | 136—67 |
| 1,653,587 | 12/1927 | Rixdorff | 136—67 X |
| 3,310,437 | 3/1967 | Davee et al. | 136—13 |
| 3,488,218 | 1/1970 | Metzler et al. | 136—67 |
| 3,494,800 | 2/1970 | Shoeld | 136—176 |
| 1,659,654 | 2/1928 | Hazelett | 29—2 |

ANTHONY SKAPARS, Primary Examiner